United States Patent Office 3,763,206
Patented Oct. 2, 1973

---

3,763,206
4-HYDROXY-2,6-DI-TERT.ALKYLPHENYL-CYANATES
Heimo Brunetti, Reinach, Switzerland, assignor to Ciba-Geigy Corporation, Ardsley, N.Y.
No Drawing. Filed Oct. 26, 1971, Ser. No. 192,591
Claims priority, application Switzerland, Nov. 9, 1970, 16,549/70
Int. Cl. C07c *119/04*
U.S. Cl. 260—453 AR  3 Claims

ABSTRACT OF THE DISCLOSURE

New 4-hydroxy - 2,6 - di - tert.alkylphenylcyanates are intermediates for the synthesis of stabilizers. They are prepared by reacting a 2,6-di-tert.alkylhydroquinon with bromo- or chlorocyanine.

---

The present invention relates to new 4-hydroxy-2,6-di-tert.alkylphenylcyanates which are used as intermediate products for the synthesis of stabilisers, and to their manufacture.

It is known that sterically hindered phenols, for example 2,6-di-tert.butylphenol, in the form of their alkali salts can be reacted with cyanogen halides, in good yields, to give the corresponding 2,6-dialkyl-arylcyanates. On the other hand it is also known that both unsubstituted and substituted hydroquinones can be reacted with cyanogen halides and bases to give the corresponding aryl-bis-cyanates. It was therefore to be expected that 2,6-dialkyl-hydroquinones would be converted into 2,6-dialkyl-aryl-1,4-bis-cyanates under such reaction conditions.

Against this it has been found, surprisingly, that new compounds of the Formula I

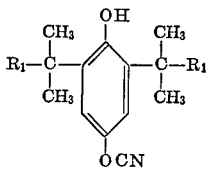

are obtained in a compound of the Formula II

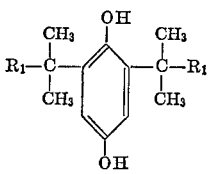  (II)

is reacted with a compound of the Formula III

—CN  (III)

in which formulae $R_1$ denotes methyl or ethyl and $R_2$ denotes chlorine or bromine, in the presence of a base, in an inert organic medium.

The compounds of the Formulae II and III, as well as the base, are here employed in approximately equimolar amounts, a small excess of the compound of the Formula III being of advantage.

Tertiary amines are advantageously employed as bases, for example triethylamine, diethylaniline, pyridine or triethylenediamine.

Possible inert organic media are, for example: hydrocarbons such as hexane, heptane, benzene, toluene, xylene or ligroin, chlorinated hydrocarbons such as methylene chloride, chloroform, carbon tetrachloride, chlorobenzene or dichlorobenzene, ethers such as diethyl ether and ketones such as acetone or diethyl ketone.

The reaction to give the compounds of the Formula I can be carried out by initially taking the compound of the Formula II and adding the compound of the Formula III and the base simultaneously or by initially taking the compounds of the Formulae II and III and adding the base. The compound of the Formula III can here be employed as a solid, liquid or gas. If the compound of the Formula III is cyanogen chloride, the reaction is advantageously carried out below 10° C., whilst if it is cyanogen bromide the reaction can also be carried out at temperatures up to 60° C.

The new compounds of the Formula I are intermediate products for polymer stabilisers. For example, they can be converted by acid-catalysed or base-catalysed trimerisation to give previously known 2,4,6-tris-(3,5-di-tert.alkyl-4-hydroxyphenoxy)-3-triazines which are used as heat stabilisers.

The invention is explained in more detail in the examples which follow.

EXAMPLE 1

66.6 g. of 2,6-di-tert.butylhydroquinone are suspended in 200 ml. of hexane. The suspension is cooled to 0–5° C., 22 ml. of liquid cyanogen chloride are added and 30.3 g. of triethylamine are introduced dropwise at this temperature. In the course of this, the 2,6-di-tert.butylhydroquinone slowly dissolves and triethylammonium chloride precipitates. The mixture is stirred for a further 4 hours at 0–5° C. and is filtered, and the residue is rinsed with 200 ml. of toluene used in portions. The entire filtrates are evaporated under a water pump vacum. 63.5 g. of 3,5-di-tert.butyl-4-hydroxyphenylcyanate remain in the form of a yellowish oil which on being left to stand solidifies to give crystals of melting point 72° C.

If, in this example, the equimolecular amount of diethylaniline or trimethylenediamine is used instead of triethylamine, similar yields of 3,5-di-tert.butyl-4-hydroxyphenylcyanate are obtained. The same is true if instead of hexane an equal amount of acetone, toluene or carbon tetrachloride is used.

EXAMPLE 2

10 g. of 2,6-di-tert.amyl-hydroquinone are dissolved in 20 ml. of toluene. 4.3 g. of cyanogen bromide are added to the pale yellow solution at 0–5° C. and subsequently 4 g. of triethylamine are introduced dropwise. The mixture is stirred for 5 hours at 0–5° C. and 2 hours at room temperature, the precipitate which has formed is filtered off and the filtrate is evaporated in vacuo. 12.6 g. of crude 3,5-di-tert.amyl-4-hydroxyphenylcyanate are thus obtained in the form of an orange-yellow oil which gives the following analytical data:

N: calculated 5.09%; found 5.3%. O: calculated 11.62%; found 10.7%. Molecular weight: calculated 275.37; found 272.

I claim:

1. Compounds of the general formula

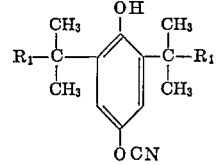  (I)

wherein $R_1$ is methyl or ethyl.

2. Compound according to claim 1, of the formula

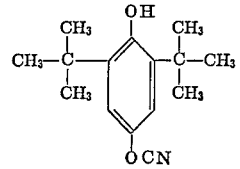

3. The compound according to claim 1, of the formula
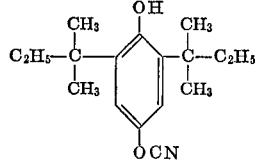
References Cited
UNITED STATES PATENTS
3,107,261   10/1963   Gerber et al. _____ 260—453
3,553,244   1/1971    Grigat et al. _____ 260—453
LEWIS GOTTS, Primary Examiner
D. H. TORRENCE, Assistant Examiner
U.S. Cl. X.R.
260—45.8 N, 248 NS